(12) United States Patent
Ferrari et al.

(10) Patent No.: US 11,787,609 B2
(45) Date of Patent: Oct. 17, 2023

(54) HINGED FLIP-TOP CAP WITH TAMPER-EVIDENT INNER RING

(71) Applicant: Affaba & Ferrari S.r.l., Borgo San Giovanni (IT)

(72) Inventors: Silvia Ferrari, Lodi (IT); Guglielmo Ferrari, Lodi (IT)

(*) Notice: Subject to any disclaimer, the term of this patent is extended or adjusted under 35 U.S.C. 154(b) by 0 days.

(21) Appl. No.: 17/813,008

(22) Filed: Jul. 15, 2022

(65) Prior Publication Data

US 2023/0029126 A1 Jan. 26, 2023

(30) Foreign Application Priority Data

Jul. 21, 2021 (IT) .................. 102021000019367

(51) Int. Cl.
*B65D 47/36* (2006.01)
*B29D 99/00* (2010.01)
*B65D 47/08* (2006.01)

(52) U.S. Cl.
CPC ......... *B65D 47/36* (2013.01); *B29D 99/0096* (2013.01); *B65D 47/0838* (2013.01)

(58) Field of Classification Search
None
See application file for complete search history.

(56) References Cited

U.S. PATENT DOCUMENTS

| | | | | |
|---|---|---|---|---|
| 5,725,115 A * | 3/1998 | Bosl | ................. | B65D 41/3428 215/258 |
| 8,550,270 B2 * | 10/2013 | Jackel | ................. | B65D 47/0838 215/354 |
| 8,931,243 B2 * | 1/2015 | Guglielmini | ........... | B65D 51/00 53/471 |
| 9,382,045 B2 * | 7/2016 | Wohlgenannt | ..... | B65D 43/0212 |
| 9,868,570 B2 * | 1/2018 | Ferrari | ............... | B65D 47/0842 |
| 10,287,067 B2 * | 5/2019 | Benoit-Gonin | .... | B65D 47/0804 |
| 11,661,250 B2 * | 5/2023 | Rognard | ................ | B65D 55/02 222/546 |
| 2006/0011667 A1 * | 1/2006 | Skillin | ............... | B65D 47/0828 222/556 |

(Continued)

FOREIGN PATENT DOCUMENTS

| EP | 2137078 B1 * | 6/2012 | ......... B65D 47/0819 |
|---|---|---|---|
| EP | 3105138 B1 * | 12/2019 | ............. B65D 1/023 |
| WO | WO-2015121177 A1 * | 8/2015 | ............. B65D 1/023 |

OTHER PUBLICATIONS

Italian Patent and Trademark Office, Search Report, dated Mar. 17, 2022.

*Primary Examiner* — Paul R Durand
*Assistant Examiner* — Michael J. Melaragno
(74) *Attorney, Agent, or Firm* — Themis Law

(57) ABSTRACT

A hinged flip-top cap with a tamper-evident inner ring includes a base portion, which extends into a pourer portion, and a flip-top lid. A hinge arrangement connects the flip-top lid to the base portion and is foldable with respect to said base portion, so that flip-top lid can be tilted with respect to the base portion and moved between a closed position above the base portion and an open position detached and rotated from the base portion. The inner ring is position inwardly of the flip-top lid and the base portion and operates as a tamper-evident element that reveals whether a first opening between the flip-top lid and the base portion has been made.

7 Claims, 4 Drawing Sheets

(56) References Cited

U.S. PATENT DOCUMENTS

| | | | |
|---|---|---|---|
| 2008/0035681 A1* | 2/2008 | Skillin | B65D 47/0819 |
| | | | 222/556 |
| 2010/0102021 A1* | 4/2010 | Guglielmini | B65D 47/0833 |
| | | | 215/230 |
| 2010/0233394 A1* | 9/2010 | Morini | B65D 41/3457 |
| | | | 264/294 |
| 2011/0042341 A1* | 2/2011 | Jackel | B65D 51/1688 |
| | | | 215/355 |
| 2012/0067922 A1* | 3/2012 | Benoit-Gonin | B65D 55/024 |
| | | | 222/546 |
| 2016/0016703 A1* | 1/2016 | Mühlemann | B65D 41/62 |
| | | | 222/566 |
| 2016/0130047 A1* | 5/2016 | Koenigseder | B65D 47/0804 |
| | | | 220/263 |
| 2016/0368674 A1* | 12/2016 | Ferrari | B65D 47/0842 |
| 2018/0312305 A1* | 11/2018 | Rognard | B65D 47/0852 |
| 2018/0319551 A1* | 11/2018 | Ferrari | B65D 47/242 |
| 2020/0239203 A1* | 7/2020 | Rognard | B65D 85/72 |
| 2020/0354118 A1* | 11/2020 | Ferrari | B65D 41/3428 |
| 2021/0261308 A1* | 8/2021 | Ferrari | B65D 47/0804 |
| 2022/0324619 A1* | 10/2022 | Ferrari | B65D 41/16 |
| 2023/0029126 A1* | 1/2023 | Ferrari | B65D 47/36 |

* cited by examiner

HINGED FLIP-TOP CAP WITH TAMPER-EVIDENT INNER RING

FIELD OF THE INVENTION

The present invention relates to a hinged flip-top cap with a tamper-evident inner ring.

BACKGROUND OF THE INVENTION

In the field of flip-top closing devices, various caps have been developed which have a flip-top lid fixed to a base element by means of a hinge. A separate pourer body is inserted into the base element together with a separate tamper-evident or first-opening internal ring. Furthermore, the flip-top lid can be moved between an open position and a closed position and vice versa as it can be rotated around the above-mentioned hinge between its open position and its closed position.

In order to obtain this type of cap, the lid must be molded with the base element, the pourer body must be molded and finally also the tamper-evident or first-opening ring must be molded.

This tamper-evident or first-opening ring must then be assembled on the pourer body and this pair of joined elements (ring and pourer body) must be subsequently assembled in the lid with the previously molded hinged base element.

The ring in particular is produced in two portions which, when the cap is opened, become detached from each other, the first portion remaining in the lid and the second portion in the pourer.

These caps are therefore composed of several parts and involve various molding and assembly steps with an increase in costs and times.

US 100287067 relates to a hinged flip-top cap with a tamper-evident inner ring comprising a base portion (12) and a flip-top lid in which the pourer portion is inserted into the base portion.

US 2010/233394 relates to a method for the manufacturing of a cap in which the base is inserted into the covering part.

SUMMARY OF THE INVENTION

The general objective of the present invention is to produce a hinged flip-top cap with a tamper-evident inner ring that provides for the smallest possible number of component parts.

A further objective of the present invention is to provide a hinged flip-top cap with a tamper-evident inner ring which is extremely simple to mold in its parts reduced to a minimum and easy and quick to assemble.

Another objective of the present invention is to provide a cap or closing device with an anti-tampering system capable of indicating whether the flip-top lid has been opened at least once by a user or whether it is still in its original state, not open.

Yet another objective of the present invention is to provide a hinged flip-top cap with a tamper-evident inner ring capable of solving the drawbacks of the prior art in an extremely simple, economical and particularly functional way.

The above-mentioned objectives are achieved by a hinged flip-top cap with a tamper-evident inner ring produced according to the present invention.

BRIEF DESCRIPTION OF THE DRAWINGS

The structural and functional characteristics of the present invention and its advantages with respect to the known art will become even more evident from the following description, referring to the attached schematic drawings, which show an embodiment example of the invention.

In the drawings.

DETAILED DESCRIPTION OF EMBODIMENTS OF THE INVENTION

Figure 1:
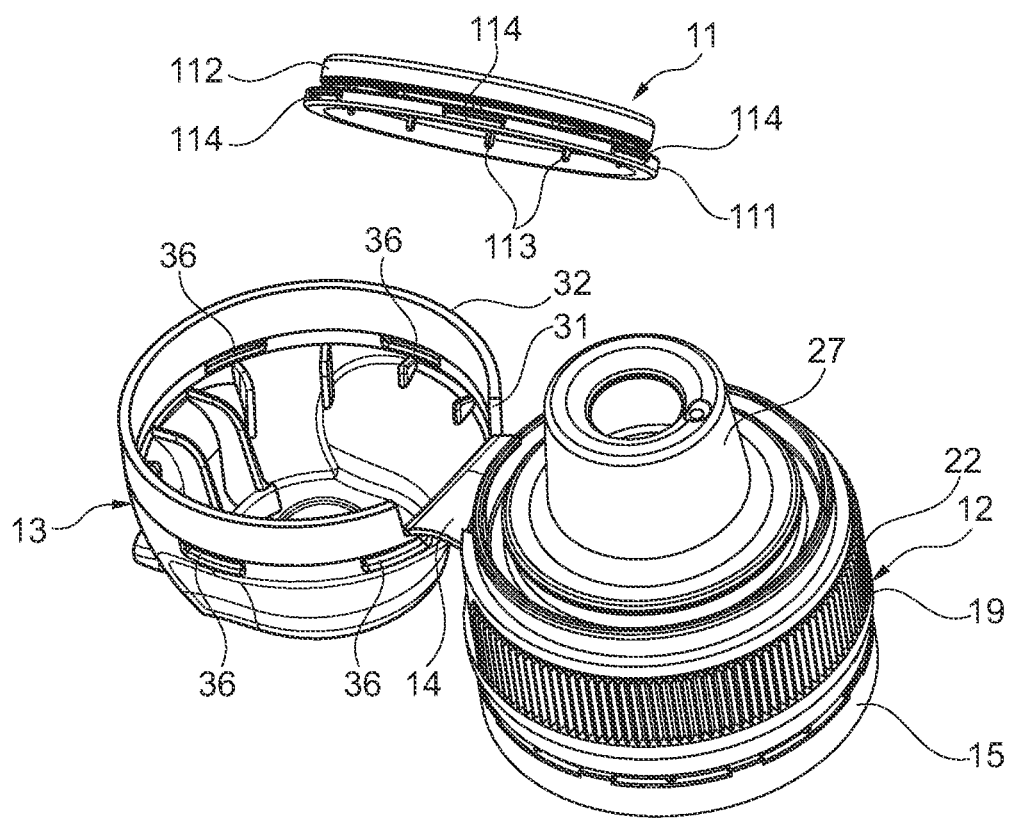
FIG. 1 is a perspective view of a hinged flip-top cap according to the present invention with the lid in an open position and with a tamper-evident inner ring exploded from the rest of the cap.

In the following description, for the illustration of the figures, identical reference numbers are used for indicating construction elements with the same function. Furthermore, for clarity of illustration, some numerical references may not have been repeated in all the figures.

Indications such as "vertical" and "horizontal", "upper" and "lower" (in the absence of other indications) should be read with reference to the assembly (or operating) conditions and referring to the normal terminology used in current language, wherein "vertical" indicates a direction substantially parallel to that of the force of gravity vector "g" and "horizontal" a direction perpendicular to it.

With reference to the exemplary and non-limiting figures, these show an embodiment of a hinged flip-top cap with a tamper-evident inner ring according to the present invention.

This type of cap closes a container and, according to the present invention, has an internal ring which reveals evidence of tampering or the first opening of the lid with respect to the remaining part of the cap.

The flip-top cap according to the present invention, suitable for being arranged for closing a container, or its mouthpiece, comprises a base portion 12 and a flip-top lid 13 connected by means of a folding hinge arrangement 14.

This connection of the lid 13 causes it to be tiltable with respect to the base portion 12 so that the tilting lid 13 can be moved between a closed position (FIG. 3) and an open position (FIG. 2), when a first opening has been made.

It should be noted that a specific feature of the cap according to the present invention is that it is produced in a single piece, with the exception of an inner ring 11 which forms an additional element intended for revealing the first opening. This inner ring 11 is arranged between the base portion 12 and the flip-top cover 13 and is constrained in its parts to both when they are closed over each other.

The base portion 12 is formed starting from the bottom by a tamper-evident ring 15 which is positioned on an annular protrusion 16 of a mouthpiece 17 (FIGS. 3 and 4) of a container (not shown), thanks to the presence of an internal annular projection 16', protruding radially inwardly, for engagement with the annular protrusion 16.

This tamper-evident ring 15 is connected by means of a series of bridges 18 to a cylindrical casing 19 which has an internal threading 20 suitable for being coupled with an external threading 21 provided on the mouthpiece 17.

The casing 19 has a knurled outer surface portion 22 which improves gripping and it should also be noted that in the outer surface portion of the shell 19 there is also a partial notch 23 which extends at least partially onto said outer surface of the casing 19, and does not cover the whole perimeter.

Said notch 23 is also connected by means of bridges 24 to the facing portions of the surface and generates a string 25 when the cap is unscrewed from the mouthpiece 17. This string 25 is in any case designed for keeping the tamper-evident ring 15, constrained to the mouthpiece 17, connected to the whole remaining part of the cap (base portion 12 and lid 13) thus avoiding dispersion into the environment of polluting and non-biodegradable parts of plastic material.

The casing 19 extends upwardly into a flange 26, directed radially inwardly with respect to the cylindrical surface of the casing 19, from whose internal end a wall of a shaped pourer portion 27 extends upwardly.

A circular annular wall 28 is also provided on the flange 26, arranged externally to the wall of the pourer portion 27 and axially directed upwards with respect to the cap. Furthermore, at one end of a vertical section 29 of the pourer portion 27, there is an annular enlargement 30, extending radially outwardly.

It should also be remembered that the hinge arrangement 14 extends from the casing 19 in the form of a flap which at the other end is connected to the lid 13 in a recess 31 provided on a lower edge 32 of the lid 13.

The lid 13 is shaped in the form of an overturned cup and provides an upper end wall 33 from which a flap 34 extends outwardly for activating the overturning of the lid 13.

The lower edge 32 of the lid 13 is suitable for closure outside the circular annular wall 28 which extends upwards from the flange 26.

From the upper end wall 33 of the cover 13, an annular projection 35 extends towards the inside of the same, destined for being tightly inserted inside a curved end 35' of the mouthpiece 17, in an axial direction.

It should be remembered that, according to the present invention, both the base portion 12 which extends into a pourer portion 27 and the flip-top lid 13 are produced in a single piece by molding, with the exception of the inner ring 11 which forms an additional element and acts as a "tamper evident" element which reveals whether a first opening has been made between the parts of the cap.

Furthermore, the lid 13 also provides, in its side wall, a series of six rectangular openings 36 all arranged at the same height in a circumferential direction.

It has also been indicated that the cap provides, as the only additional element and not molded with it, a ring 11 which is destined for being positioned in its interior.

Said ring 11 is produced in two parts and comprises a first annular portion having a larger diameter 111 and a second annular portion with a smaller diameter 112 connected to each other by at least two frangible bridges 113, one constrained to the lid 13 and the other in engagement with the base portion 12.

In the example shown in particular, a series of bridges 113 are provided, arranged within the two annular portions 111, 112 and directed according to the axis of the annular portions themselves.

The first annular portion with a larger diameter 111 also provides, on one of its external surfaces, circumferentially spaced toothings 114, which can be at least two in number and which in the example are six in number, protruding radially outwardly.

Said toothings 114, having a rectangular prismatic form, are inserted into the rectangular openings 36 of the side wall of the lid 13, and are also at least two in number. In this example, six openings 36 are produced at the same height as the side wall of the lid 13, according to a circumferential direction.

Furthermore, the second annular portion with a smaller diameter 112 provides that its lower edge extends curved inwardly at 115 in a circumferential extension.

The lower edge curved inwardly 115 is abutted upon assembly beneath the annular enlargement 30, extending radially outwardly, from the vertical section 29 of the pourer portion 27 which extends from the flange 26.

The cap in its parts, the base portion 12 and the flip-top lid 13, connected by means of the hinged arrangement 14, are molded as shown in FIG. 1 in the open position, whereas the ring 11 is molded separately.

Figure 2:
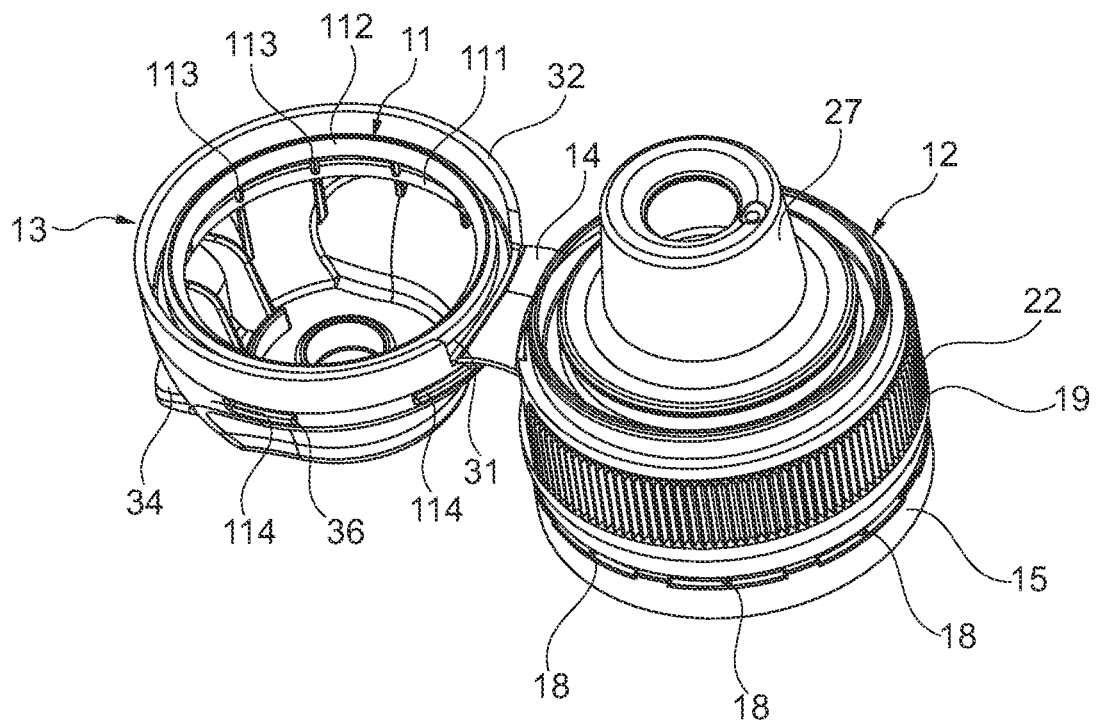
FIG. 2 shows a perspective view of the cap with a lid in an open position similar to that of FIG. 1 in which the inner ring has been put in its position inside the lid.

The ring 11 is then inserted into the lid 13 as shown in FIG. 2.

Upon insertion, the toothings 114, having a rectangular prismatic form, of the first annular portion with a larger diameter 111 are inserted into the rectangular openings 36 of the side wall of the lid 13, blocking the whole ring 11 in this position, with the second portion annular having a smaller diameter 112, connected to the first portion 111, facing upwards.

Proceeding then to rotate the lid 13 on the base portion 12 for closure, the second annular portion with a smaller diameter 112 is inserted between the circular annular wall 28 and the vertical section 29 of the pourer portion 27.

In this way, the lower edge curved inwardly 115 of the second annular portion with a smaller diameter 112 becomes abutted beneath the annular enlargement 30, extending radially outwardly, from the vertical section 29 of the pourer portion 27.

There is thus a reciprocal blocking between the parts of the cap and the parts of the ring 11, with the lid 13 of the cap closed on the base portion 12.

According to the invention, a method for forming a hinged flip-top cap with a tamper-evident inner ring is therefore also provided, wherein the cap comprises the base portion 12, which extends into the pourer portion 27, the flip-top lid 13 and the inner ring 11.

The method for forming said flip-top cap comprises the following steps:

a step wherein said base portion 12, which extends into a pourer portion 27, and said flip-top lid 13, connected by means of a hinge arrangement 14, are molded in an open position, a step wherein said ring 11 is molded separately, a step wherein the ring 11 is inserted in the lid 13, wherein, upon insertion, toothings 114 of a first annular portion having a larger diameter 111 of said ring 11 are inserted in openings 36 provided in a side wall of the lid 13, blocking the whole ring 11 in this position, with a second annular portion having a smaller diameter 112, connected to the first portion 111 by means of bridges 113 and facing upwards, a rotation step of the lid 13 which can be overturned on the base portion 12 for closure which causes the insertion of the second annular portion having a smaller diameter 112 between a circular annular wall 28 and a vertical section 29 of a pourer portion 27 so that a lower edge curved inwardly 115 of the second annular portion having a smaller diameter 112 becomes abutted beneath an annular enlargement 30, extending radially outwardly, from a vertical section 29 of the pourer portion 27 so as to cause a reciprocal blocking between the parts of the cap and the parts of the ring 11, with the lid 13 of the cap closed on the base portion 12.

It should be pointed out that in this closed position, the cap can be washed for sterilization without any problem as the only openings towards the outside (the six openings 36) are sealed by the toothings 114.

When the cap is thus completely assembled, said cap is positioned on the mouthpiece 17 of the container thanks to the engagement of the annular protrusion 16 of the mouthpiece 17 on the internal annular projection 16' of the tamper-evident ring 15, which is positioned on a mouthpiece 17 (FIGS. 3, 4a and 4b, 6 and 7) of a container (not shown).

Figure 3:
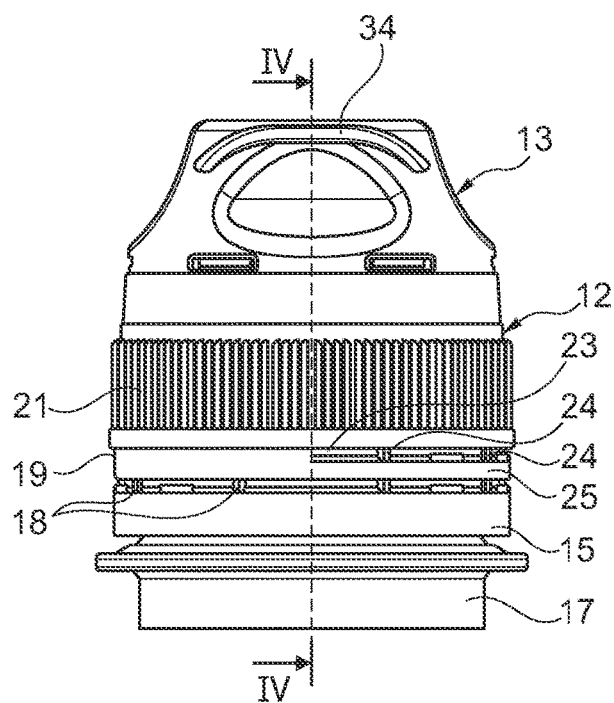
FIG. 3 shows a raised front view of the cap of FIG. 1 as it appears closed, not yet open, positioned on a mouthpiece of a container.
Figure 5:
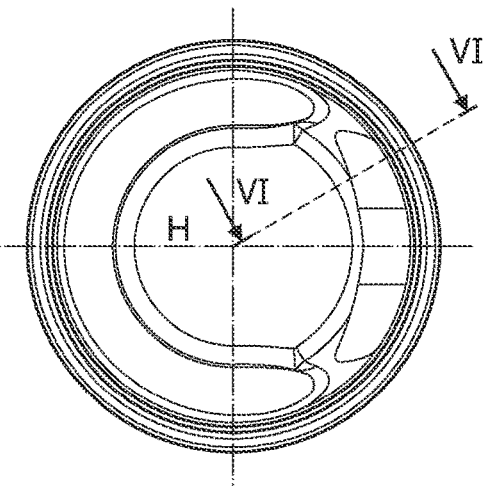
FIG. 5 is a plan view from above of the closed cap.
Figure 4A:
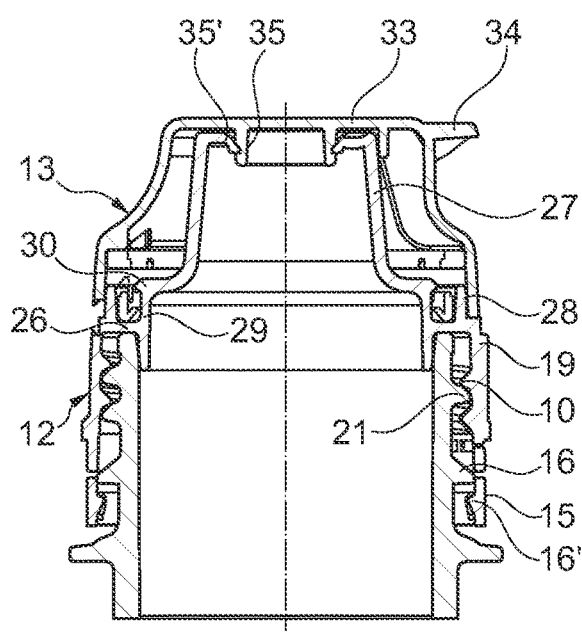
FIG. 4a is a raised section of the cap along the line IV-IV of FIG. 3.
Figure 4B:
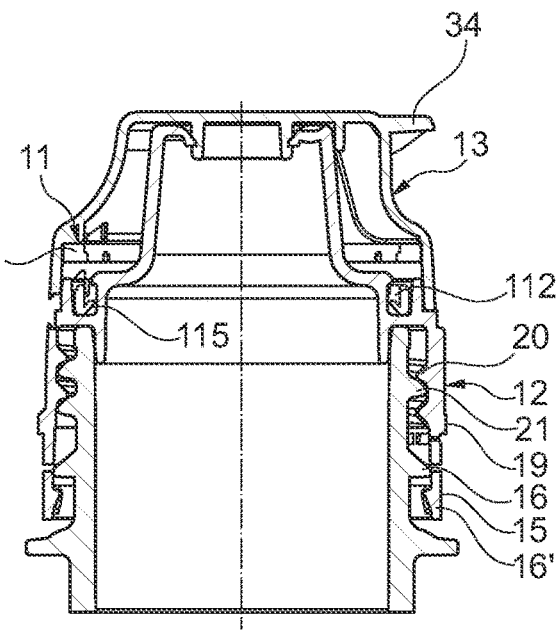
FIG. 4b is a raised section of the cap according to the same line as in FIG. 3, but when the cap has been opened and shows the ring split into two parts.
Figure 6:
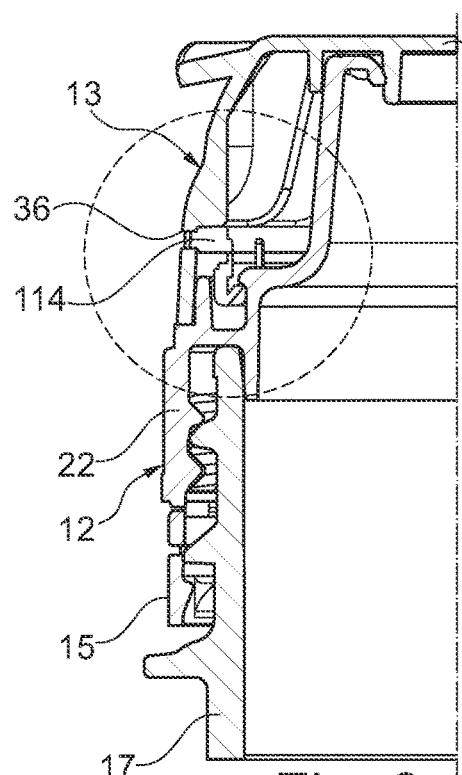
FIG. 6 is a raised section of the cap along the line VI-VI of FIG. 5, when the lid has not yet been opened.
Figure 7:
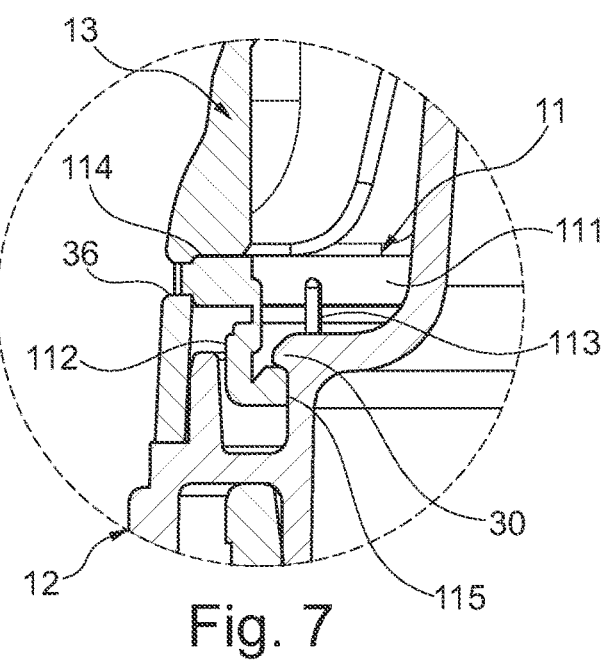
FIG. 7 is a view of an enlarged detail of the cap as indicated in the circumference of FIG. 6.
Figure 8:
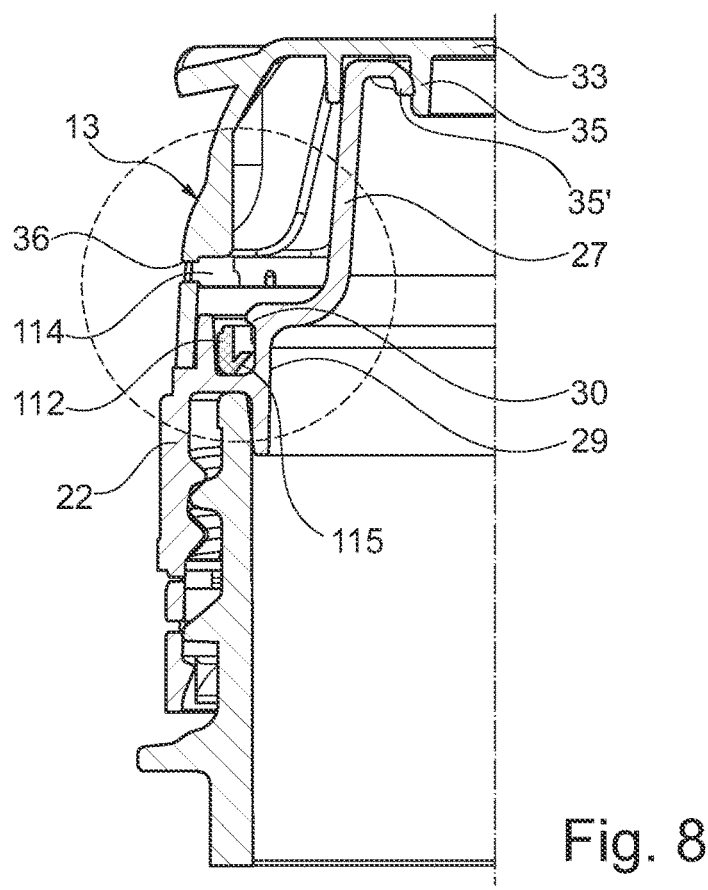
FIG. 8 is a raised section of the cap according to the line VI-VI of FIG. 5, but when the lid has been opened and the inner ring has been separated into two parts, revealing the first opening.

If the cap is to be opened for pouring the contents of the container from the mouthpiece 17, it is necessary to act on the flap 34 for actuating the overturning of the lid 13, bringing the lid 13 from the position of FIG. 3 to that of FIG. 2.

This overturning causes the breakage of the bridges 113 connecting the first annular portion having a larger diameter 111 and the second annular portion with a smaller diameter 112 of the ring 11.

Figure 9:
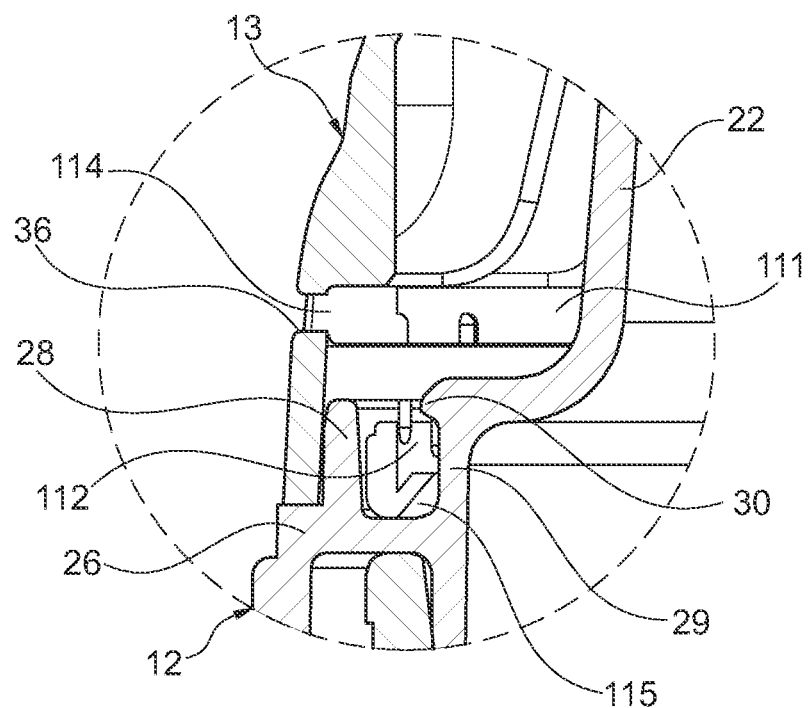
FIG. 9 is a view of an enlarged detail of the cap with an internal ring separated into two as indicated in the circumference of FIG. 8.
Figure 10:
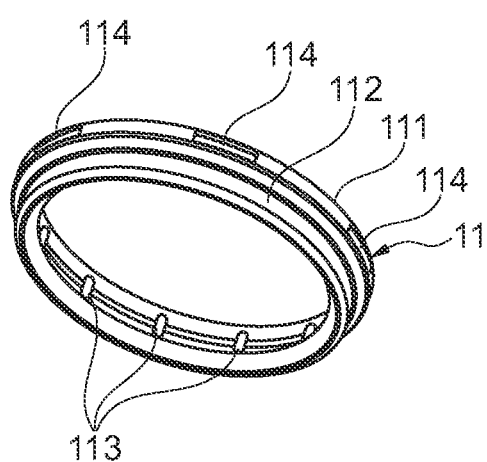
FIG. 10 is a further enlarged perspective view of the tamper-evident inner ring only shown in FIG. 1.

The first annular portion with a larger diameter 111 thus remains inside the lid 13 thanks to the engagement of the toothings 114 in the openings 36 of the lid itself (FIG. 9).

The second annular portion with a smaller diameter 112, on the other hand, becomes detached from the first annular portion having a larger diameter 111 and is positioned between the circular annular wall 28 and arranged externally to the wall of the pourer portion 27 in a kind of housing or annular channel, remaining therein (FIG. 9).

This ring creates a tamper-evident group which thus comprises a first tamper-evident element (which remains integral with the cover 13) and a second tamper-evident element (which falls inside the base portion 12).

The two tamper-evident elements 111 and 112 are, in their original state and after manufacturing and before use, or before a first opening by the user, connected to each other arranged inside the closed cap.

And only after the movement from the first closed position to the second open position, in the direction moving away from the hinged lid from the base portion, does the breakage of the two parts 111, 112 of the ring 11 take place.

It should also be noted that the ring 11, i.e., the first annular portion having a larger diameter 111 and the second annular portion with a smaller diameter 112, can be made of a completely non-transparent or opaque material or having a different color from that of the cap so as to be more clearly visible when attached to each other and/or detached and separate. They can have, for example, the same or different colors.

After this tamper-evident group has been broken from its original form in a single piece, i.e., after the frangible bridge or bridges between the first annular portion having a larger diameter 111 and the second annular portion with a smaller diameter 112 have been broken or shattered, they are still attached and fixed on one side to the lid and on the other to the base portion 12, even if they are separated from each other.

In this way, it is ensured that no part of the cap, or rather in this case of the tamper-evident or tamper-proof group, is detached from the cap and this prevents the creation of more separate parts. It is important, in fact, for recycling and environmental pollution to avoid the dispersion of small separate parts of plastic waste.

In this respect, it has been previously seen that the cap can provide the above-mentioned string 25, designed for keeping the tamper-evident ring 15 connected to the mouthpiece 17, and the remaining part of the cap such as the base portion 12 and the lid 13. Also in this case, avoiding the dispersion of polluting and non-biodegradable parts of plastic material into the environment.

The objective mentioned in the preamble of the description has thus been achieved.

The protection scope of the present invention is defined by the enclosed claims.

The invention claimed is:

1. A hinged flip-top cap with a tamper-evident inner ring comprising:
    a base portion;
    a flip-top lid,
    wherein the flip-top lid is connected by a hinge arrangement that is foldable with respect to the base portion so that the flip-top lid can be tilted with respect to the base portion and the flip-top lid moved between a closed position above the base portion and an open position detached and rotated from the base portion; and
    an inner ring with respect to both the flip-top lid and the base portion, the inner ring being a tamper-evident element that reveals whether a first opening between the base portion and the flip-top lid has been made,
    wherein the inner ring comprises a first annular portion having a larger diameter and a second annular portion having a smaller diameter, the first and the second annular portions being connected to each other by at least two frangible bridges, one of the frangible bridges being constrained to the flip-top lid and another one of the frangible bridges being in engagement with the base portion, and
    wherein the base portion extends into a pourer portion, and the inner ring in the first annular has an outer surface with at least two toothings, circumferentially spaced apart and radially protruding outwardly, and the flip-top lid has a side wall with at least two openings that are circumferentially spaced apart and configured to receive the at least two toothings.

2. The hinged flip-top cap according to claim 1, wherein the inner ring in the second annular portion has a lower edge that extends curved inwardly into a circumferential extension which, upon assembly, becomes abutted beneath an annular enlargement extending radially outwardly from a vertical portion of the pourer portion.

3. The hinged flip-top cap according to claim 2, wherein the base portion has a casing with a cylindrical surface that extends upwardly into a flange directed radially inwardly with respect to the cylindrical surface of the casing, a wall of the pourer portion extending upwardly from an internal end of the flange, a circular annular wall being provided on the flange arranged externally with respect to the wall of the pourer portion and being axially directed upwards with respect to the flip-top cap, and wherein the lower edge of the second annular portion is housed between the vertical portion of the pourer portion and the circular annular wall.

4. The hinged flip-top cap according to claim 2, wherein the inner ring is made of a completely non-transparent material or an opaque material, or has a different color from a color of the flip-top cap.

5. The hinged flip-top cap according to claim 1, wherein the base portion has a casing with a cylindrical surface that extends downwards into a tamper-evident ring connected thereto by frangible bridges and positioned on an annular protrusion of a mouthpiece of a container, the tamper-evident ring being provided with an internal annular projection protruding radially inwardly.

6. The hinged flip-top cap according to claim 1, wherein the base portion has a casing with a cylindrical surface, wherein a partial notch is defined in a portion of the cylindrical surface, wherein the partial notch extends at least partly onto a surface of the casing without covering an entire perimeter thereof, wherein frangible bridges are arranged in the partial notch and connect facing portions of the cylindrical surface and generate a string configured to maintain a connection of a tamper-evident ring beneath all of a remaining upper part of the flip-top cap that includes the base portion and the flip-top lid.

7. A method of forming a hinged flip-top cap with a tamper-evident inner ring according to claim 1, wherein the flip-top cap comprises a base portion, extending into a pourer portion, a flip-top lid and an inner ring, the method comprising:

molding the base portion and the flip-top lid, which are connected by a hinge arrangement, in an open position;

molding separately the inner ring;

inserting the inner ring in the flip-top lid, wherein, upon insertion, toothings of a first annular portion having a larger diameter of the inner ring are inserted in openings defined in a side wall of the flip-top lid, blocking the inner ring in position, a second annular portion having a smaller diameter being connected to the first portion by bridges and facing upwards; and rotating the flip-top lid, wherein overturning the flip-top lid on the base portion for closure causes an insertion of the second annular portion between a circular annular wall and a vertical section of the pourer portion so that a lower edge curved inwardly of the second annular portion becomes abutted beneath an annular enlargement extending radially outwardly from a vertical section of the pourer portion, thereby causing a reciprocal blockage between the flip-top lid, the base portion, and the inner ring, with the flip-top lid closed on the base portion.

* * * * *